United States Patent
Avgerinos et al.

(10) Patent No.: US 9,208,319 B2
(45) Date of Patent: Dec. 8, 2015

(54) CODE BASE PARTITIONING SYSTEM

(75) Inventors: Athanasios Avgerinos, Pittsburgh, PA (US); Mariusz H. Jakubowski, Bellevue, WA (US); Marcus Peinado, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/327,172

(22) Filed: Dec. 15, 2011

(65) Prior Publication Data

US 2013/0160133 A1 Jun. 20, 2013

(51) Int. Cl.
| | |
|---|---|
| H04L 29/06 | (2006.01) |
| G06F 21/57 | (2013.01) |
| G06F 21/60 | (2013.01) |
| G06F 21/71 | (2013.01) |

(52) U.S. Cl.
CPC .............. *G06F 21/57* (2013.01); *G06F 21/602* (2013.01); *G06F 21/71* (2013.01); *G06F 2221/2113* (2013.01); *G06F 2221/2141* (2013.01); *G06F 2221/2149* (2013.01)

(58) Field of Classification Search
CPC .......................... G06F 21/10; G11B 20/00086
USPC ..................................................... 726/26–30
See application file for complete search history.

(56) References Cited

U.S. PATENT DOCUMENTS

| | | | |
|---|---|---|---|
| 5,724,590 A | 3/1998 | Goettelmann et al. | |
| 6,044,466 A | 3/2000 | Anand et al. | |
| 6,993,640 B2 | 1/2006 | Doing et al. | |
| 7,010,633 B2 | 3/2006 | Arndt et al. | |
| 7,254,586 B2 | 8/2007 | Chen et al. | |
| 7,380,119 B2 | 5/2008 | Bade et al. | |
| 7,380,276 B2 | 5/2008 | Saha et al. | |
| 7,530,103 B2 | 5/2009 | Willman et al. | |
| 7,594,111 B2 | 9/2009 | Kiriansky et al. | |
| 7,613,891 B2 | 11/2009 | Rudelic | |
| 7,681,240 B2 | 3/2010 | Maheshwari et al. | |
| 7,716,720 B1 | 5/2010 | Marek et al. | |
| 7,900,059 B2 | 3/2011 | Bade et al. | |
| 7,921,686 B2 | 4/2011 | Bagepalli et al. | |
| 7,975,147 B1 * | 7/2011 | Qumei | 713/193 |
| 8,060,934 B2 | 11/2011 | Cabuk et al. | |

(Continued)

OTHER PUBLICATIONS

Necula, George C.; McPeak, Scott; Rahul, Shree P.; Weimer, Westley; "CIL: Intermediate Language and Tools for Analysis and Transformation of C Programs", R. N. Horspool (Ed.): International Conference on Compiler Construction 2002, LNCS 2304, pp. 213-228, 2002; downloaded from "http://www.cs.virginia.edu/~weimer/p/weimer-cc2002.pdf" on Apr. 9, 2012.

(Continued)

*Primary Examiner* — Anthony Brown
(74) *Attorney, Agent, or Firm* — Alin Corie; Kate Drakos; Micky Minhas (57) ABSTRACT

The subject disclosure is directed towards partitioning a code base of a program into a trusted portion and an untrusted portion. After identifying sensitive data within the code base using annotation information, one or more program elements that correspond to the sensitive data are automatically transformed into secure program elements that can be retained in the untrusted portion of the code base. Cryptographic techniques are used to minimize a potential size of the trusted portion of the code base. Source files for the trusted portion and the untrusted portion are generated.

18 Claims, 8 Drawing Sheets

(56) References Cited

U.S. PATENT DOCUMENTS

| | | | |
|---|---|---|---|
| 8,108,641 | B2 | 1/2012 | Goss et al. |
| 8,619,971 | B2 | 12/2013 | Kurien et al. |
| 8,621,649 | B1 | 12/2013 | Van Dijk et al. |
| 8,627,053 | B2 | 1/2014 | Mittal |
| 8,627,414 | B1 | 1/2014 | McCune et al. |
| 2002/0069176 | A1 | 6/2002 | Newman |
| 2003/0014281 | A1 | 1/2003 | Inoue et al. |
| 2003/0018892 | A1 | 1/2003 | Tello |
| 2003/0177390 | A1 | 9/2003 | Radhakrishnan et al. |
| 2004/0044739 | A1* | 3/2004 | Ziegler ............................ 709/213 |
| 2004/0260570 | A1 | 12/2004 | Dunn et al. |
| 2005/0021463 | A1 | 1/2005 | Miller |
| 2005/0108103 | A1 | 5/2005 | Roberts et al. |
| 2005/0273605 | A1* | 12/2005 | Saha et al. ..................... 713/166 |
| 2006/0178940 | A1 | 8/2006 | Taylor et al. |
| 2007/0074188 | A1* | 3/2007 | Huang et al. .................. 717/141 |
| 2007/0244720 | A1 | 10/2007 | Walker |
| 2009/0007104 | A1 | 1/2009 | Zimmer et al. |
| 2009/0138335 | A1 | 5/2009 | Lieberman |
| 2009/0157502 | A1 | 6/2009 | Cooper et al. |
| 2009/0265760 | A1 | 10/2009 | Zhu et al. |
| 2009/0327748 | A1* | 12/2009 | Agrawal et al. ............... 713/189 |
| 2010/0010902 | A1 | 1/2010 | Casey |
| 2010/0049627 | A1 | 2/2010 | Geppert et al. |
| 2010/0082991 | A1 | 4/2010 | Baldwin et al. |
| 2010/0250441 | A1 | 9/2010 | Coppinger |
| 2010/0281273 | A1 | 11/2010 | Lee et al. |
| 2011/0055585 | A1 | 3/2011 | Lee |
| 2012/0331550 | A1 | 12/2012 | Raj et al. |

OTHER PUBLICATIONS

McCune, Jonathan M.; "Reducing the Trusted Computing Base for Applications on Commodity Systems"; School of Electrical and Computer Engineering, Carnegie Mellon University; Jan. 13, 2009; downloaded from "http://sparrow.ece.cmu.edu/group/pub/mccunej_phd.pdf" on Apr. 9, 2012.

Brumley, David; Song, Dawn; "Privtrans: Automatically Partitioning Programs for Privilege Separation"; Carnegie Mellon University; USENIX Security Symposium, pp. 57-72, 2004, downloaded from "http://www.ece.cmu.edu/~dawnsong/papers/privtrans.pdf" on Apr. 9, 2012.

Zdancewic et al; "Secure program partitioning"; In ACM Transactions on Computer Systems, 2002; Published on Aug. 23, 2002, Association of Computing Machinery, vol. 20 Issue 3, Aug. 2002,pp. 283-328; Cornell University Computer Science Department Technical Report 2001-1846; Retrieved from "http://www.cis.upenn.edu/~stevez/papers/ZZNM02.pdf" on Apr. 9, 2012.

Schwartz et al; "All you ever wanted to know about dynamic taint analysis and forward symbolic execution (but might have been afraid to ask)." In Proceedings of the IEEE Symposium on Security and Privacy, pp. 317-331, May 2010.

Zhang et al.; "Hiding Program Slices for Software Security"; In Proceedings of the 2003 Internal Conference on Code Genration and Optimization, p. 325-336; downloaded from "http://citeseerx.ist.psu.edu/viewdoc/download?doi=10.1.1.13.962&rep=rep1&type=pdf" on Apr. 9, 2012

Smith et al; Refactoring Programs to Secure Information Flows [Smith et al, PLAS'06];Proceedings of the 2006 workshop on Programming languages and analysis for security, p. 75-84, Association for Computing Machinery; downloaded from "http://www.cs.jhu.edu/~mthober/papers/smith-thober-plas06.pdf" on Apr. 9, 2012.

Bittau et al., University College London; "Wedge: Splitting Applications into Reduced-Privilege Compartments"; Proceedings of the 5th USENIX Symposium on Networked Systems Design and Implementation, USENIX, 2008, p. 309-322; downloaded from "http://pdos.csail.mit.edu/6.858/2011/readings/wedge.pdf" on Apr. 9, 2012.

Ganapathy et al.; "The Design and Implementation of Microdrivers"; Proceedings of the 13th international conference on Architecural support for programming languages and operating systems, p. 168-178, Mar. 2008 ; downloaded from "http://citeseerx.ist.psu.edu/viewdoc/download?doi=10.1.1.146.2170&rep=rep1&type=pdf" on Apr. 9, 2012.

Venkataramani et al.; "FlexiTaint: A Programmable Accelerator for Dynamic Taint Propagation"; In 14th International Symposium on High Performance Computer Architecture, Feb. 14, 2008; downloaded from "http://www.cc.gatech.edu/~milos/venkataramani_hpca08.pdf" on Apr. 9, 2012.

Avgerinos et al; "AEG: Automatic Exploit Generation"; Carnegie Mellon University, Pittsburgh, PA; In 18th Annual Network & Distributed System Security Symposium, Feb. 6-9, 2011; Retrieved from "http://security.ece.cmu.edu/aeg/aeg-ndss-2011.pdf" on Apr. 10, 2012.

Chong, et al., "Secure Web Applications via Automatic Partitioning", Available at: <<https://www.cs.cornell.edu/andru/papers/swift.html>>, SOSP '07, Oct. 14-17, 2007, Stevenson, Washington, USA, 14 pages.

Garfinkel, et al., "Terra: A Virtual Machine-Based Platform for Trusted Computing", Available at: <<http://www.cs.sunysb.edu/~rob/teaching/cse509-sp06/terra.pdf, SOSP '03, Oct. 19-22, 2003, Bolton Landing, New York, USA, pp. 193-206.

Zdancewic, et al., "Untrusted Hosts and Cofidentiality: Secure Program Partitioning", Available at: <<http://citeseerx.ist.psu.edu/viewdoc/download?doi=10.1.1.64.4564&rep=rep1&type=pdf>>, Proceedings of the 18th ACM Symposium on Operating Systems Principles (SOSP), Oct. 2001, Banff, Canada, 14 pages.

Zheng, et al., "Using Replication and Partitioning to Build Secure Distributed Systems", Available at: <<http://repository.upenn.edu/cgi/viewcontent.cgi?article=1056&context=cis_papers>>, University of Pennsylvania Scholarly Commons, Departmental Papers, May 11, 2003, 16 pages.

* cited by examiner

CODE BASE PARTITIONING SYSTEM

BACKGROUND

It has become increasingly important for developers (e.g., software component developers, such as application and operating system developers) to ensure data confidentiality and integrity for programs that involve sensitive data, particularly in the face of sophisticated security threats. Software vulnerabilities, whether benign software code defects (e.g., bugs) or exploitable software code (e.g., buffer overflows, format string vulnerabilities and/or the like), may cause problems for a software vendor's valued customers. A typical program executes software code at a same privilege level where security-sensitive and non-security-sensitive program elements are vulnerable to malicious/fraudulent activities, such as sensitive/critical data extraction or alteration. An intrusion into one program element enables entry into any other component. For these reasons, the developers continually work at preventing malicious software attacks, intrusions and other forms of fraudulent electronic activity via the software vulnerabilities.

A trusted computing base (TCB) of a computing environment/system is the set of hardware, firmware, and/or software components (e.g., operating system components, device drivers, hypervisors and/or the like) that are significant in ensuring security including data confidentiality and integrity, in the sense that any software vulnerability associated with the trusted computing base may jeopardize the security of the entire computing environment. Characteristics related to size and complexity of software programs render typical trusted computing bases impractical to analyze for the software vulnerabilities.

Due to the hierarchical privilege structure of the computing environment, programs that operate on such trusted computing bases may inherit these software vulnerabilities and/or may further provide additional vulnerabilities when such programs (e.g., virtual machine monitors, security-sensitive applications and/or the like) also run as privileged software code (e.g., a privileged process mode, such as kernel mode or hypervisor mode). Software code associated with such privileged programs adds to a size of the trusted computing base.

Various code-partitioning schemes provide security by dividing the program into trusted and untrusted portions in which the trusted portions form a portion of the trusted computing base and run at a different privilege level than the untrusted portions. The trusted portions that are large in size provide a considerable number of opportunities for malicious attacks and reduce the benefits and practicality of executing these portions in a separate execution environment with a different privilege level. Large amounts of trusted code also inhibit any meaningful examination as to correctness. Furthermore, the code-partitioning schemes often require substantially manual tasks that prove to be error-prone and slow.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards automatically partitioning a code base into a trusted portion and an untrusted portion of a program. In one aspect, an automated partitioning mechanism transforms program elements that correspond to sensitive data into secure program elements, which may be included in the untrusted portion of the program instead of the trusted program. In one aspect, the program elements may be secured using encryption or any other confidentiality or authentication technique.

In one aspect, the automated partitioning mechanism may generate the secure program elements from an intermediate representation of the code base, which enables taint propagation analysis using annotation information. The intermediate representation includes conversions of expressions and function calls into statements. In one aspect, the annotation information may be provided as data type qualifiers for variables in the source or intermediate code representation. These type qualifiers facilitate identification of dataflow operations, such as assignments of the sensitive data to dependent variables, and computation operations on the sensitive data. The dataflow operations may be retained in the untrusted portion and the computation operations may be classified as the trusted portion. In one aspect, the sensitive data may be encrypted prior to the dataflow operations and decrypted during the computation operations.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards partitioning a code base of a program into a trusted portion and an untrusted portion comprising program elements that reference sensitive data. These program elements may be identified using annotation information and automatically transformed into secure program elements. After generating source files for the untrusted portion and trusted portion, these source files may be compiled and executed. In one implementation, the trusted portion may be executed in a separate execution component of a computing environment and in a different privilege level (e.g., process mode) from the untrusted portion.

It should be understood that any of the examples herein are non-limiting. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and secure computing in general.

Figure 1:
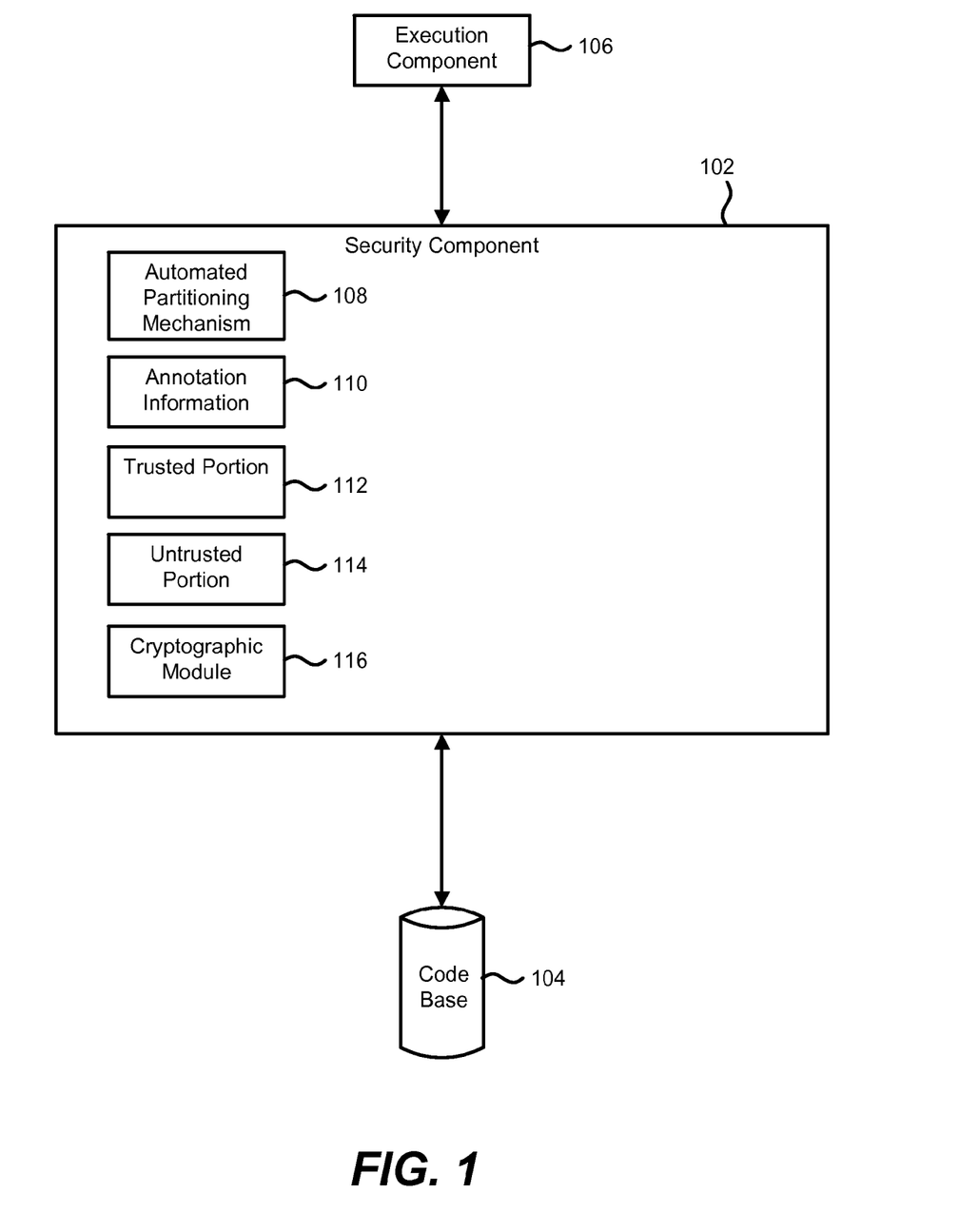
FIG. 1 is a block diagram illustrating an example system for partitioning a code base into a trusted portion and an untrusted portion according to one example implementation.

FIG. 1 is a block diagram illustrating an example system for partitioning a code base into a trusted portion and an untrusted portion according to one example implementation. Components of the example system may include a security component 102, a code base 104 and an execution component 106. The code base 104 may store programs corresponding to various hardware and/or software components (e.g., applications, such as web applications). The execution component 106 may include hardware, firmware, and/or software components (e.g., applications, operating system components, input/output device drivers, hypervisors and other virtual machine programs and/or the like) upon which various portions of the code base 104 may run. The execution component 106 may include a portion of a trusted computing base as described herein.

In one example implementation, the security component 102 may include an automated partitioning mechanism 108 that, through analyzing annotation information 110 associated with the code base 104, generates source files for a trusted portion 112 and an untrusted portion 114 of the code base 104. The automated partition mechanism 108 may generate the annotation information 110 automatically through an analysis of data types utilized by the code base 104 according to one implementation. The trusted portion 112 may also join the trusted computing base where an available isolation mechanism may secure the trusted portion 112 and sensitive data.

The automated partitioning mechanism 108 may secure the untrusted portion 114 via a cryptographic module 116, which may insert encryption and decryption operations into programming logic related to program elements that correspond with sensitive data. For example, the sensitive data may be in an encrypted form during execution of one or more source files for the untrusted portion 114 and in decrypted form during execution of one or more source files for the trusted portion 112. This partition serves to reduce a potential size of the trusted portion 112 by keeping certain code within the untrusted portion 114. It is appreciated that the sensitive data includes any information or code for which a user or developer may desire protection. While passwords and credit card information may typify common forms of the sensitive data, answers to security questions, transaction confirmations and/or code that perform security-sensitive operations (e.g., private key or hash value generation) also may constitute embodiments of the sensitive data.

The program elements being secured may include variables (e.g., input variable/dependent variable declarations), statements corresponding to dataflow operations (e.g., assignments) and/or computation operations (e.g., expressions) and/or the like. As described herein, the encryption and decryption operations may include function calls to the cryptographic module 114 with the sensitive data as an argument or input variable. In order to enable data encryption/decryption on variables of certain data types, the automated partitioning mechanism 108 modifies a corresponding format by expanding the certain data types to include space for an encrypted version of the sensitive data. For example, the automated partitioning mechanism 108 may convert a character variable into an integer variable in order to store a larger encrypted data unit.

In one example implementation, the trusted portion 112 and the untrusted portion 114 may embody an input device (e.g., keyboard) driver that secures input data (e.g., keyboard-entered sensitive data) before being stored in a common buffer to which various programs may access. The trusted portion 112 may include code (e.g., processor-executable instructions) for encrypting the input data while the untrusted portion 114 executes dataflow operations between the common buffer and the various programs. For example, if a user enters a password and/or credit card information via a keyboard, such information is encrypted before being stored in a keystroke buffer. Unless a program element executes a computation operation on encrypted keystrokes, such as authenticating the password for a login process or completing a transaction in a payment process, the automated partitioning mechanism 108 designates such a program element as untrusted code.

In another example implementation, the trusted portion 112 and the untrusted portion 114 may embody an Internet web application (e.g., an e-commerce application) operating in conjunction with a server component to authenticate passwords, process payment information and/or perform computations on other sensitive data (e.g., monetary transaction-related data, such as money transfer amounts and online order/payment confirmations). The annotation information 110 may indicate which program elements of the Internet web application correspond to (e.g., reference) the passwords, the payment information and/or the other sensitive data. The automated partitioning mechanism 108 may determine whether to secure one or more of these program elements using the cryptographic module 116. If the server component executes complex operations, the automated partitioning mechanism 108 may retain program elements that handle, but do not modify, encrypted data in the untrusted portion 114 in one implementation. Accordingly, the code base 104 for the Internet web application remains substantially intact.

Alternatively, the automated partitioning mechanism 108 may secure program elements of the code base 104 and thereby retain more code in the untrusted portion 114 using various data integrity/authentication measures, such as hash values, checksums, digital signatures and/or the like. For example, after computing a hash value for a user-entered password, the Internet web application may perform various operations on the user-entered password, such as comparing the hash value to a counterpart hash value from a known password during a login process; the automated partition mechanism 108 may retain code for these operations in the untrusted portion 114. As another example, a user may input a dollar amount when prompted with a money transfer transaction to a bank account followed by a dialog box requiring a confirmation of such a transaction (e.g., via a mouse click or a "Y"/"N" keyboard stroke). After computing a checksum value for the dollar amount and/or the confirmation, the Internet web application may perform various operations on these sensitive inputs without jeopardizing integrity, because as long as the checksum values match during finalization of the money transfer transaction, the Internet web application may assure the user that an intruder did not modify the sensitive inputs.

Figure 2:
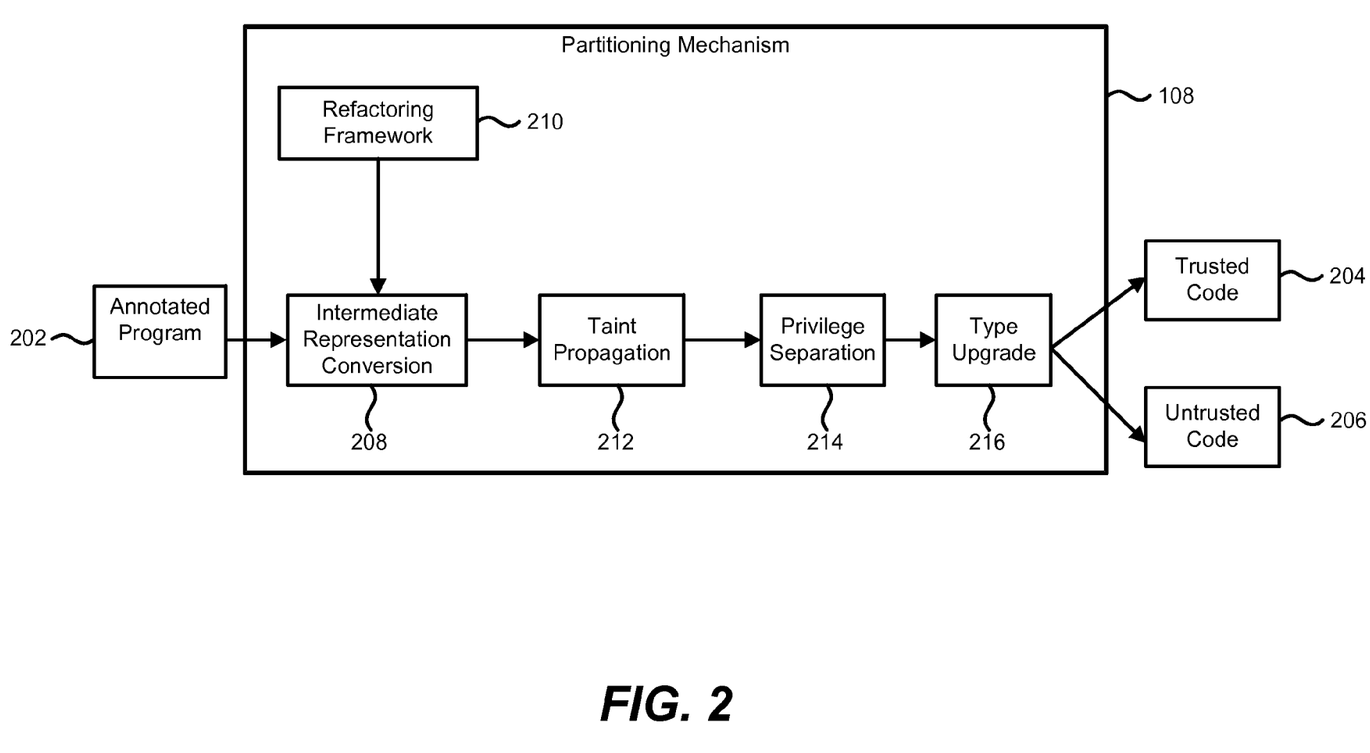
FIG. 2 is a block diagram illustrating an example transformation of an annotated program into one or more trusted programs and one or more untrusted programs for an automated partitioning mechanism according to one example implementation.

FIG. 2 is a block diagram illustrating an example transformation of an annotated program into one or more trusted programs and one or more untrusted programs for an automated partitioning mechanism according to one example implementation. The automated partitioning mechanism, such as the automated partitioning mechanism 108 of FIG. 1, may partition an annotated program 202 into trusted code 204 and/or untrusted code 206, which may be further transformed into respective programs and execute at different privilege levels (e.g., process modes, such as kernel mode and user mode). In one implementation, the trusted code 204 runs at a higher privilege level than the untrusted code 206.

In one example implementation, the automated partitioning mechanism 108 may perform an intermediate representation conversion process 208 on the annotated program 202 using a (data type/code) refactoring framework 210 associated with an intermediate language (e.g., an abstract machine language, a register transfer language or any other language used by a compiler) that is independent of a source language. After parsing the annotated program 202 and performing a semantic and syntactic analysis, the automated partitioning mechanism 108 builds abstract syntax trees and transforms source code operations/instructions into canonical form, which constitutes an intermediate representation of the annotated program 202. For example, the automated partitioning mechanism 108 may convert function calls and expressions with side-effects into statements. The intermediate representation may describe annotations as data type qualifiers that redefine underlying data types. The automated partitioning mechanism 108 may also normalize programming loops to ensure a single loop primitive. For example, a "for" loop may be converted into a "while" loop.

In order to identify program elements that reference sensitive data, as indicated in the annotated program 202, the automated partitioning mechanism 108 performs a taint propagation process 212 that searches one or more functions for input variables and operations associated with the sensitive data according to one implementation. For example, the automated partitioning mechanism 108 may process a variable declaration having a type qualifier denoting the sensitive data and search each function for a dataflow operation between the sensitive data and the variable (e.g., an input variable). The automated partitioning mechanism 108, as an option, may also identify other variables that depend on the sensitive data stored in the variable. Such (dependent) variables may store results from a computation operation on, a copy of, or otherwise reference the sensitive data (e.g., store a pointer to a memory location associated with the sensitive data).

The automated partitioning mechanism 108 may execute a privilege separation process 214 that designates the dataflow operations on the sensitive data as the untrusted code 206 and classifies computation operations associated with the sensitive data as the trusted code 204. In one implementation, the automated partitioning mechanism 108 may also generate one or more secure functions based on the computation operations in order to keep more program code in the untrusted code 206. The automated partitioning mechanism 108 may also insert encryption and decryption function calls into the trusted code 204 in order to secure the dataflow operations in the untrusted code 206.

The automated partitioning mechanism 108 may also perform a type upgrade process 216 whereby one or more variables may be modified to enable secure cryptographic operations. In one example implementation, the automated partitioning mechanism 108 changes a data type associated with an example variable into a more suitable data type for encryption, such as a transformation from a one (1) byte data type into an eight (8) byte data type. Due to the fact that there may be a limited number of permutations for encrypting the sensitive data stored in the example variable, a size of the associated data type may be enlarged to increase security and decrease a likelihood of the sensitive data being decrypted by malware or an attacker.

Figure 3:
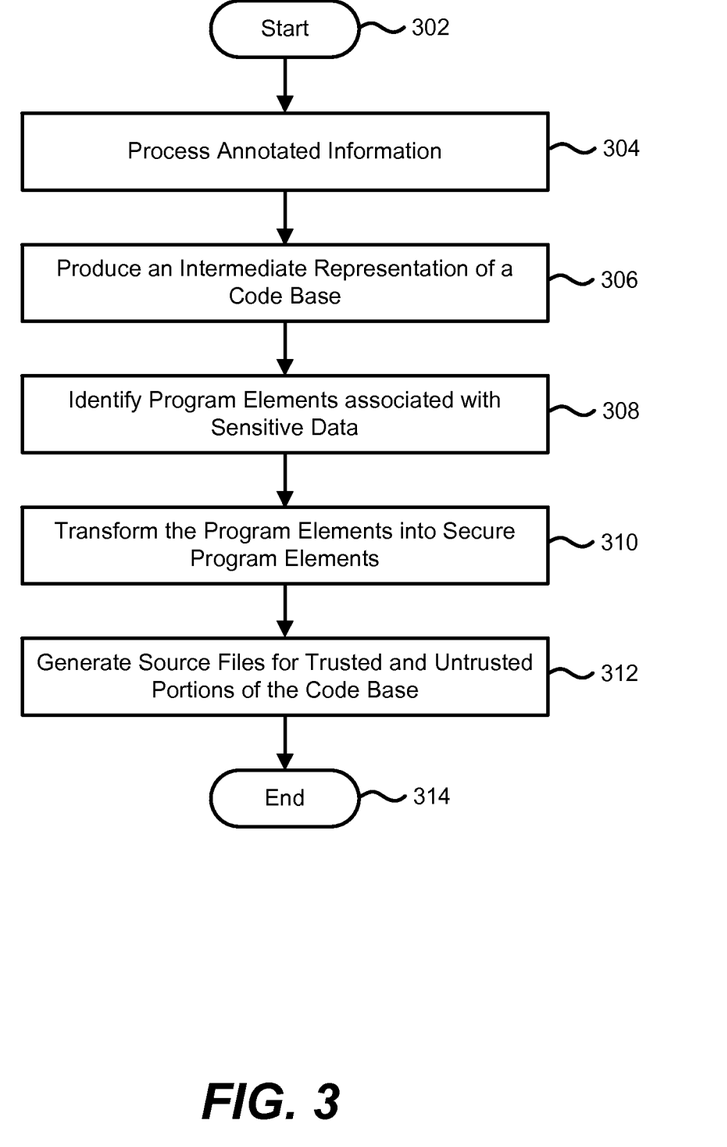
FIG. 3 is a flow diagram illustrating example steps for partitioning a code base into a trusted portion and an untrusted portion according to one example implementation.

FIG. 3 is a flow diagram illustrating example steps for partitioning a code base into a trusted portion and an untrusted portion according to one example implementation. The automated partitioning mechanism 108 may perform the example steps, which commence at step 302 and proceed to step 304 at which annotation information for a code base is processed. Step 306 is directed to producing an intermediate representation of a code base. As described herein, the intermediate representation may transform expressions having side effects and initialize declarations in statement form, such as dataflow and computation operations. Hence, the only valid statements may include assignments of side effect free expressions to variables, control-flow statements and function calls in which a return value may be stored in memory and assigned to a variable. In one implementation, the intermediate representation may include expressions without side effects. An expression is said to have a side effect if, in addition to returning a value, the expression also modifies some program state (e.g., modifies the value of a variable that is not present in the expression).

Step 308 represents an identification of program elements associated with sensitive data. The automated partitioning mechanism 108 may perform inter-procedural and intra-procedural taint propagation whereby variables that reference the sensitive data, including input variables and any dependent variables, may be examined to determine whether the referenced sensitive data may be secured (e.g., encrypted). In one example implementation, a dataflow operation, such as assignment between an example input variable that references the sensitive data and an example dependent variable and/or an initial storage of the sensitive data into the example input variable, may be secured.

Step 310 refers to transforming the program elements into secure program elements. In one implementation, the automated partitioning mechanism 108 inserts an encryption function prior to the data flow operation, modifies the data flow operation and inserts a decryption operation after the modified data flow operation. For example, the following code transformation illustrates example secure data flow operations involving an encrypted password:

| Code Prior to Transformation | Code Subsequent to Transformation |
|---|---|
| update_passwd ( )<br>{<br>  passwd = read_from_keyboard( );<br>}<br><br><br><br><br>secret = passwd;<br>example_Function(secret); | Trusted Code:<br><br>int update_passwd (char* passwd)<br>{<br>  passwd = read_from_keyboard<br>  ( );<br>  secret = encrypted( passwd);<br>}<br>Untrusted Code:<br>encrypted_Secret = secret;<br>example_Function(encrypted_<br>Secret); |

As depicted above, one example dataflow operation includes an assignment of a variable "secret" that stores the encrypted password to another variable "encrypted_Secret". Another example dataflow operation includes a function call to "example_Function" where the variable secret is a passed argument/parameter. Code implementing "example_Function" may be designated as the trusted portion or the untrusted portion. In one implementation, the function "example_Function" may be classified as the untrusted code when performing operations that do not expose the password (in decrypted or plaintext form), such as executing a hiding mechanism that prevents access to the password by protecting memory pages, sealing the password within a Trusted Platform Module (TPM) and/or other hardware-based solutions.

In another implementation, the encryption function may be executed in the trusted portion of the code base and the counterpart decryption function may be executed in another function, such as the function "example_Function", that also includes a computation operation and may be classified as the trusted portion. Furthermore, the computation operation may be converted into two or more functions where one or more are secured and may be classified as the trusted portion. An example of programming logic illustrating, such a transformation may be described in FIG. 4. Step 312 depicts generation of source files for trusted and untrusted code/portions of the code base. Step 314 terminates the example steps illustrated in FIG. 3.

Figure 4:
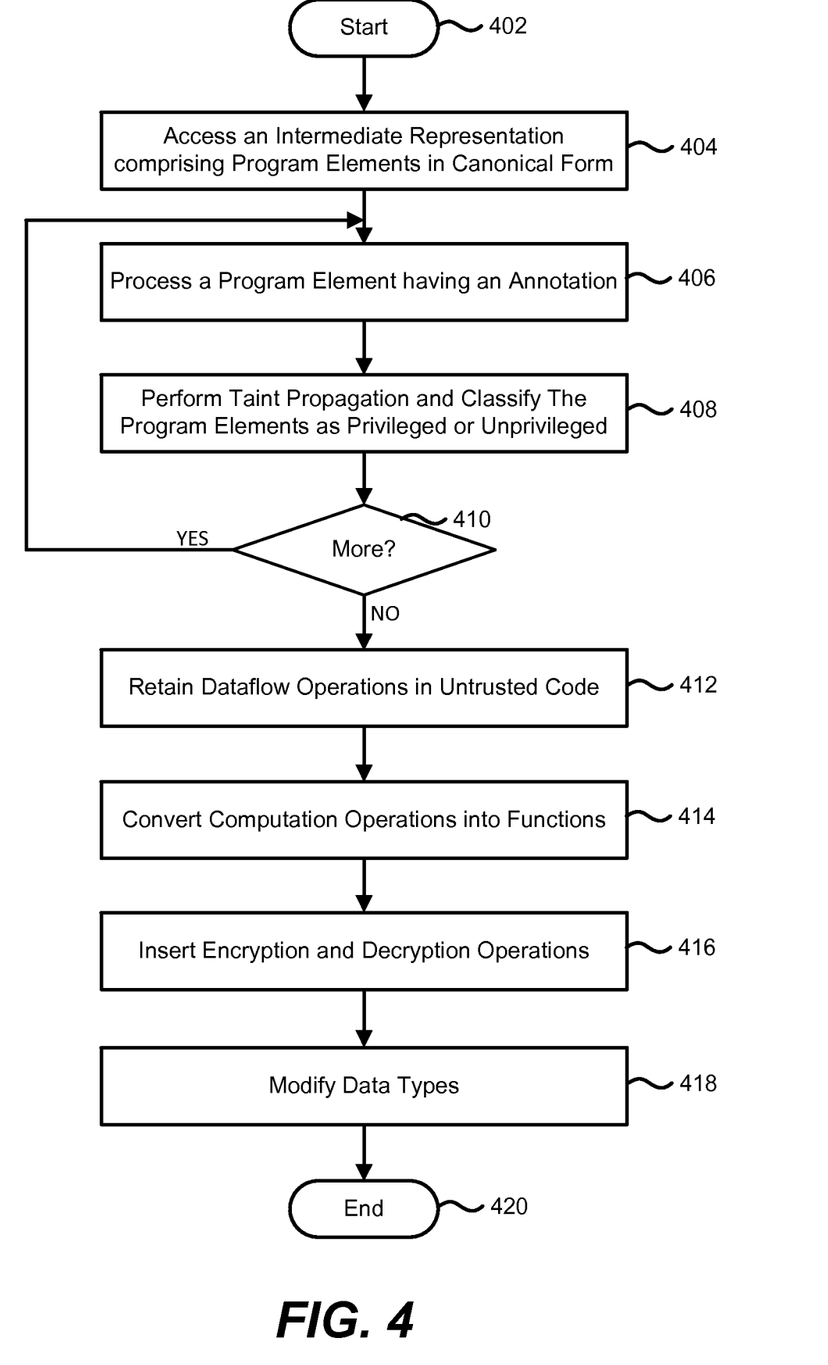
FIG. 4 is a flow diagram illustrating example steps for separating program elements in an intermediate representation of a code base according to one example implementation.

FIG. 4 is a flow diagram illustrating example steps for separating program elements in an intermediate representation of a code base according to one example implementation. The automated partitioning mechanism 108 may perform the example steps, which commence at step 402 and proceed to step 404 at which an intermediate representation comprising program elements in canonical form is accessed.

Step 406 illustrates processing of a program element having an annotation. Step 408 refers to performing taint propagation and configuring each program element with a classification of privileged (e.g., trusted) or unprivileged (e.g., untrusted). For example, the automated partitioning mechanism 108 may examine a variable having a data type qualifier that denotes a location for sensitive data input or assignment. The automated partitioning mechanism 108 may also examine each corresponding program element that references or depends from the variable. Such a variable may be associated with a subsequent operation of which the automated partitioning mechanism 108 determines whether to secure via encryption. As an example, the operation may be a combination dataflow and computation operation, which may be separated and transformed into trusted and untrusted code, respectively, and therefore, designated as unprivileged during partitioning.

Step 410 determines whether there are more annotated program elements to process. If there are more program elements, step 410 returns step 406. If there are no more program elements to process, step 410 proceeds to step 412. Step 412 is directed to retaining dataflow operations that reference the sensitive data in the untrusted code. These dataflow operations may include statements that store the sensitive data into variables as input, assign the variables to dependent variables, transfer the variables as arguments or returned results of a function call and/or the like.

Step 414 is directed to converting computation operations that reference the sensitive data into functions. Computation operations may include any non-dataflow operations performed on sensitive data (e.g., addition), expressions used to determine control-flow transfers and/or the like. In one implementation, the computation operations may or may not be alpha-equivalent to any previous operation. An expression is alpha-equivalent to another expression if both expressions are equivalent up to variable renaming. These functions may include secure functions comprising untrusted code and/or other functions comprising trusted code. By way of example, for a particular computation operation, the automated partitioning mechanism 108 may generate a set of functions and replace the particular computation operation with one or more invocations to the set of functions (e.g., function calls). In one implementation, the secure functions may be generated only for operations that are not alpha-equivalent to previous operations.

In one example implementation, a function may execute only dataflow operations and therefore, be designated as a secure function comprising the untrusted code. Another function may perform an underlying computation and therefore, be designated as the trusted code. The following illustrates an example transformation for the particular computation operation where "_input" annotates the "secret" variable in the form of a (data) type qualifier:

| Code Prior to Transformation | Code Subsequent to Transformation |
|---|---|
| _input char secret;<br>...<br>secret \|= 0xFFFF; | Trusted Code:<br><br>_input char mask(_input char secret)<br>{<br>   char result =<br>     decrypt(secret) \| 0xFFFF;<br>   return encrypt(result);<br>}<br>Untrusted Code:<br>_input char secret;<br>...<br>secret = mask(secret); |

Step 416 is directed to inserting encryption and decryption operations into the code in order to secure the dataflow operations and the functions associated with the computation operations. Within the trusted portion of the code base, the execution of these functions may be represented by function calls. In one implementation, the automated partitioning mechanism 108 inserts these function calls as expressions surrounding the dataflow operations whereby the sensitive data is encrypted prior to and decrypted subsequent to the dataflow operations (e.g., an assignment). In another implementation, the automated partitioning mechanism 108 inserts these function calls into modified expressions effectuating the original computation operations. Step 418 is directed to modifying data types corresponding to variables to enable securitization of the stored sensitive data. Step 420 terminates the example steps illustrated in FIG. 4.

Figure 5:
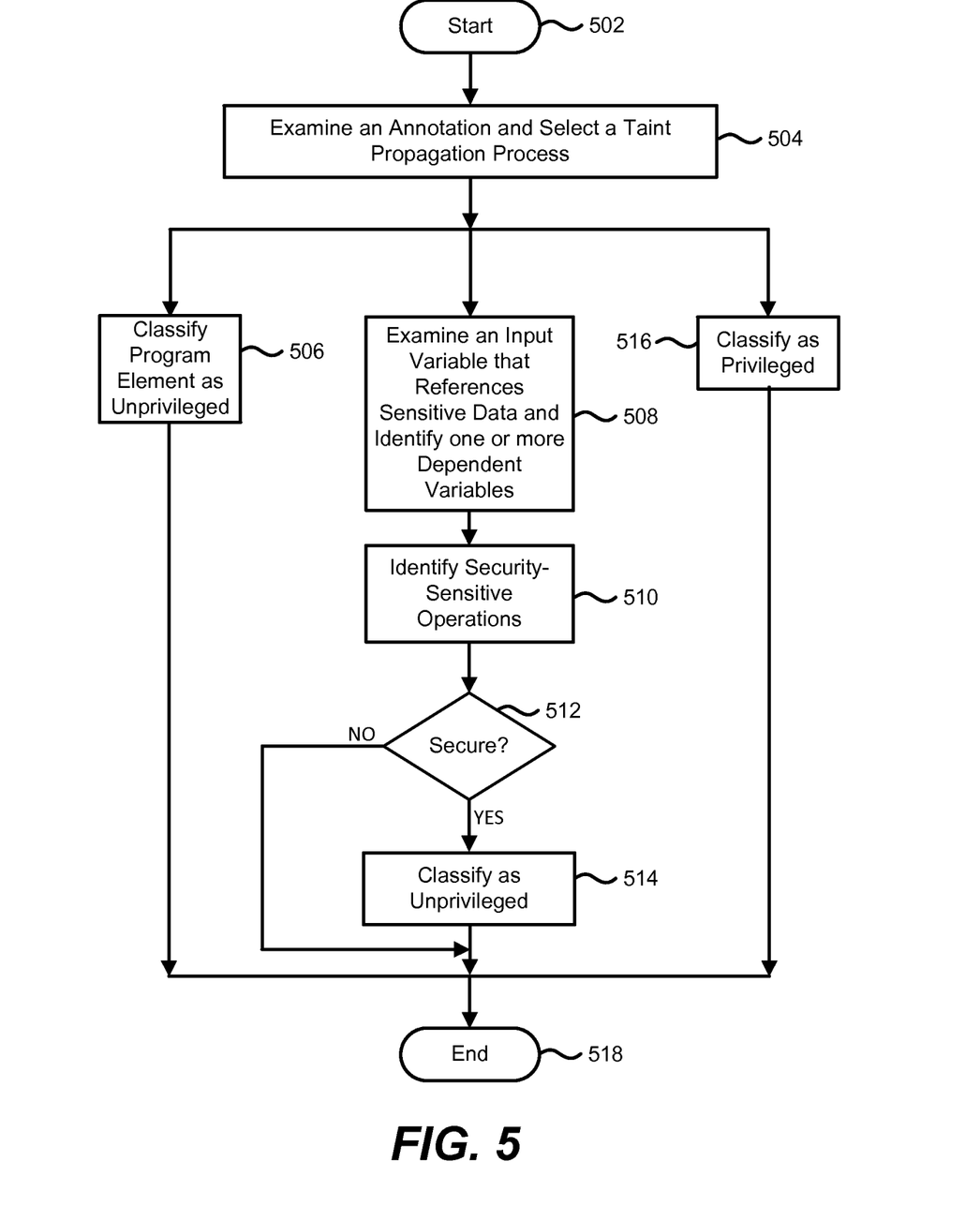
FIG. 5 is a flow diagram illustrating example steps for performing taint propagation using annotation information according to one example implementation.

FIG. 5 is a flow diagram illustrating example steps for performing taint propagation using annotation information according to one example implementation. The automated partitioning mechanism 108 may perform the example steps, which commence at step 502 and proceed to step 504 at which an annotation associated with a program element is examined prompting a selection of a taint propagation process. The annotation may be represented in an annotated program as an attribute or type qualifier.

If the automated partitioning mechanism 108 identifies a "declass" annotation, step 504 proceeds to step 506. Step 506 represents a classification of the program element as unprivileged. For example, variables marked as non-sensitive and designated as untrusted code may be used in a computation operation that produces non-sensitive results from the sensitive data, such as a hash value, and/or overwrites the sensitive data. The declass annotation halts further taint propagation thereby designating subsequent computation operations as untrusted code or unprivileged. The declass annotation may be embodied in a type qualifier in a variable declaration (e.g., "_declass char secret;") or a statement employing type casting, such as the following example code:

_input char secret;
    char clear;
    clear=(_declass char) secret;

If the automated partitioning mechanism 108 identifies an "input" annotation, step 504 proceeds to step 508. Step 508 illustrates an examination of an input variable that references sensitive data and an identification of one or more dependent variables. Step 510 refers to an identification of security-sensitive operations (e.g., dataflow operations, computation operations and/or the like). Step 512 determines whether any of these security-sensitive operations may be secured. If these security-sensitive operations are determined to be securable, step 512 proceeds to step 514 at which the security-sensitive operations may be classified as privileged. If the security-sensitive operations may not be secured, step 512 proceeds to step 518.

If the automated partitioning mechanism 108 identifies a "permanent" annotation, step 504 proceeds to step 516 at which the automated partitioning mechanism 108 classifies the program element as privileged. In one implementation, the "permanent" annotation classifies as privileged, a function that operates on the sensitive data and/or includes other sensitive code (e.g., code for authenticating or encrypting/decrypting passwords). Accordingly, the function is designated as part of the trusted code.

Figure 6:
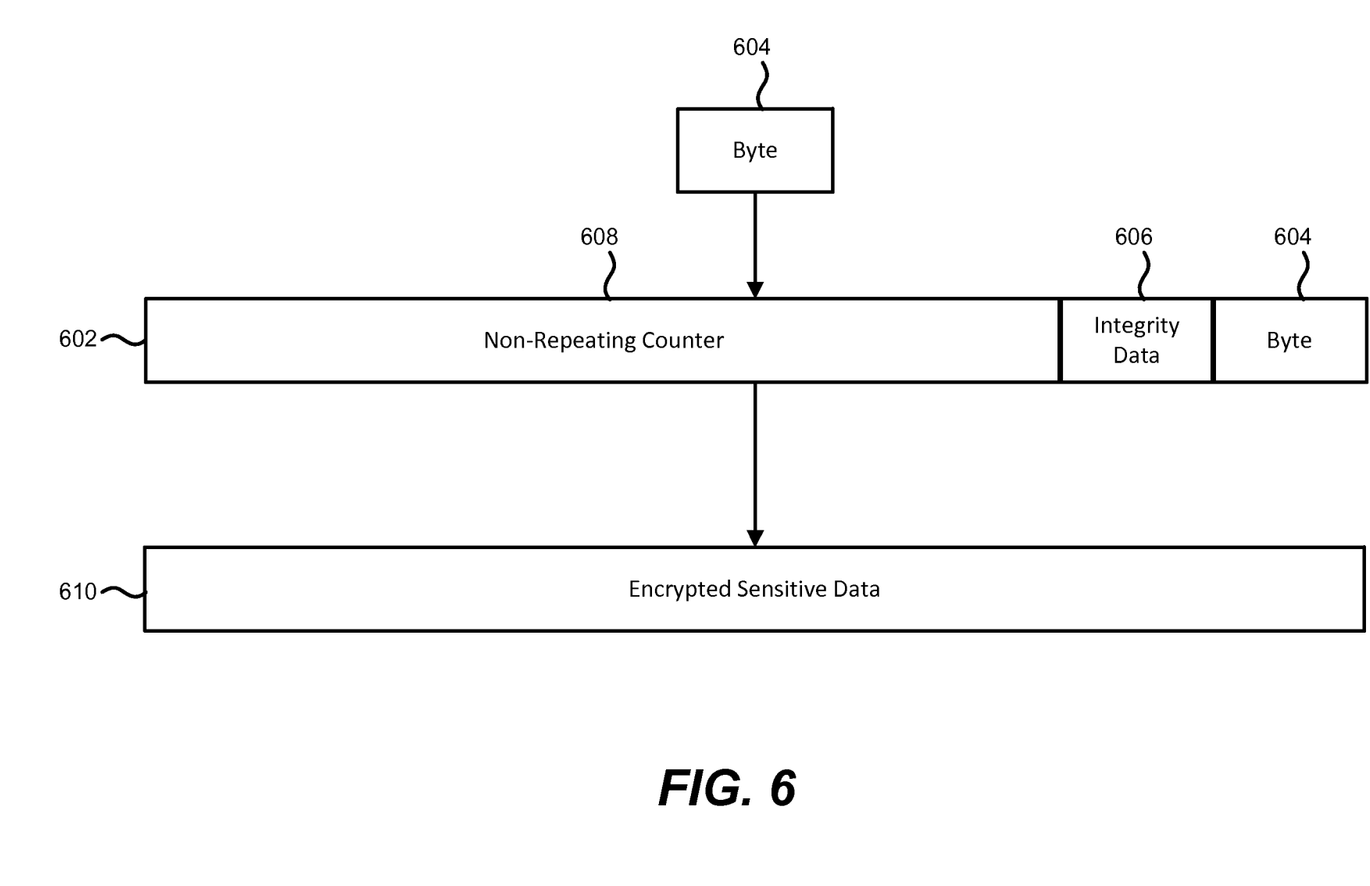
FIG. 6 illustrates an example conversion of a program element into a secure program element having a modified data type according to one example implementation.

FIG. 6 illustrates an example conversion of a program element into a secure program element having a modified data type according to one example implementation. A program element 602 having the modified data type may represent a portion of memory for storing sensitive data. Byte 604 may represent a data block that stores the sensitive data in an original data type that is transformed into the modified data type. In one implementation, integrity data 606 may include a message modification code (MDC) to guarantee data integrity, (e.g., a checksum) for the sensitive data. Non-repeating counter 608 may add entropy and be used to locate the sensitive data. In order to secure the sensitive data, the program element 602 may be transformed into a secure program element 610 comprising encrypted sensitive data.

Example Networked and Distributed Environments

One of ordinary skill in the art can appreciate that the various embodiments and methods described herein can be implemented in connection with any computer or other client or server device, which can be deployed as part of a computer network or in a distributed computing environment, and can be connected to any kind of data store or stores. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the resource management mechanisms as described for various embodiments of the subject disclosure.

Figure 7:
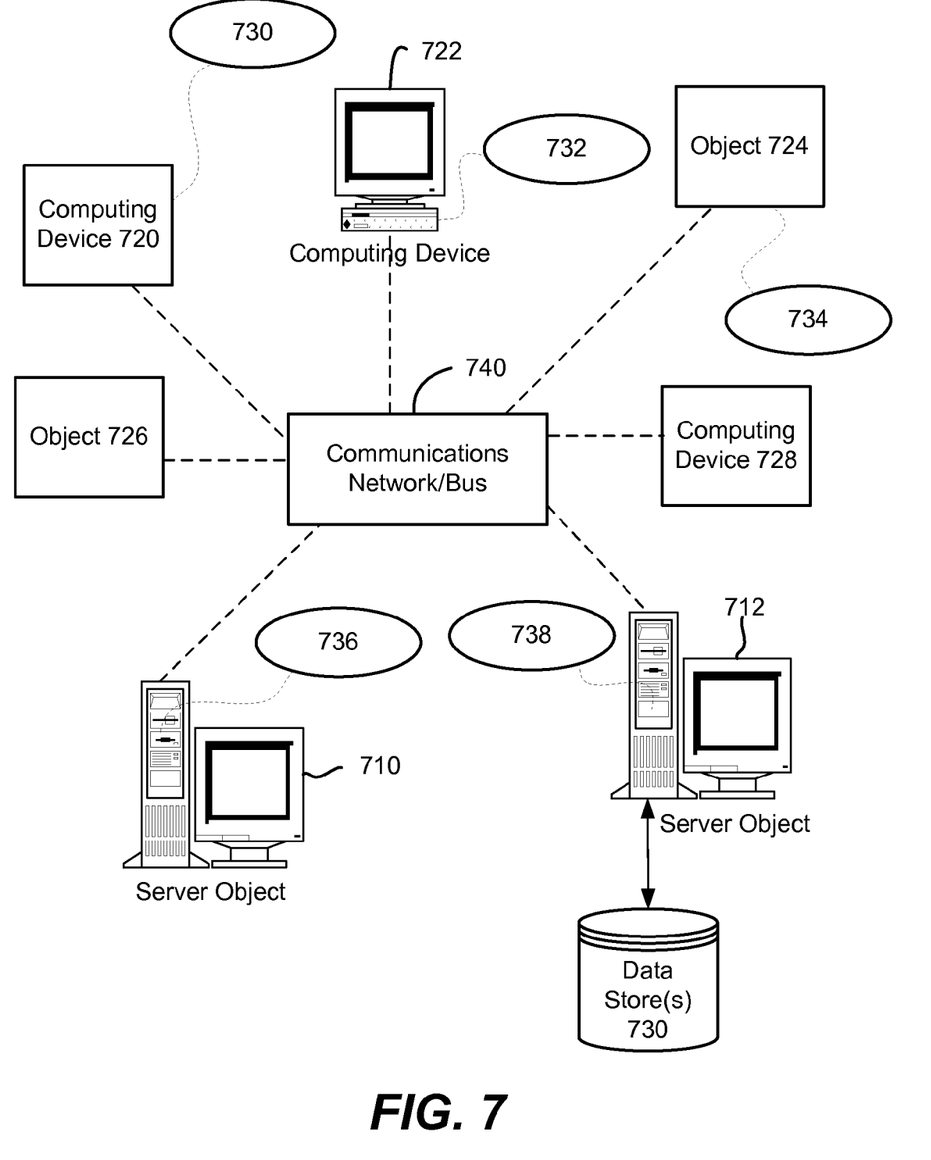
FIG. 7 is a block diagram representing example non-limiting networked environments in which various embodiments described herein can be implemented.

FIG. 7 provides a schematic diagram of an example networked or distributed computing environment. The distributed computing environment comprises computing objects 710, 712, etc., and computing objects or devices 720, 722, 724, 726, 728, etc., which may include programs, methods, data stores, programmable logic, etc. as represented by example applications 730, 732, 734, 736, 738. It can be appreciated that computing objects 710, 712, etc. and computing objects or devices 720, 722, 724, 726, 728, etc. may comprise different devices, such as personal digital assistants (PDAs), audio/video devices, mobile phones, MP3 players, personal computers, laptops, etc.

Each computing object 710, 712, etc. and computing objects or devices 720, 722, 724, 726, 728, etc. can communicate with one or more other computing objects 710, 712, etc. and computing objects or devices 720, 722, 724, 726, 728, etc. by way of the communications network 740, either directly or indirectly. Even though illustrated as a single element in FIG. 7, communications network 740 may comprise other computing objects and computing devices that provide services to the system of FIG. 7, and/or may represent multiple interconnected networks, which are not shown. Each computing object 710, 712, etc. or computing object or device 720, 722, 724, 726, 728, etc. can also contain an application, such as applications 730, 732, 734, 736, 738, that might make use of an API, or other object, software, firmware and/or hardware, suitable for communication with or implementation of the application provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for example communications made incident to the systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, e.g., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 7, as a non-limiting example, computing objects or devices 720, 722, 724, 726, 728, etc. can be thought of as clients and computing objects 710, 712, etc. can be thought of as servers where computing objects 710, 712, etc., acting as servers provide data services, such as receiving data from client computing objects or devices 720, 722, 724, 726, 728, etc., storing of data, processing of data, transmitting data to client computing objects or devices 720, 722, 724, 726, 728, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network 740 or bus is the Internet, for example, the computing objects 710, 712, etc. can be Web servers with which other computing objects or devices 720, 722, 724, 726, 728, etc. communicate via any of a number of known protocols, such as the hypertext transfer protocol (HTTP). Computing objects 710, 712, etc. acting as servers may also serve as clients, e.g., computing objects or devices 720, 722, 724, 726, 728, etc., as may be characteristic of a distributed computing environment.

Example Computing Device

As mentioned, advantageously, the techniques described herein can be applied to any device. It can be understood, therefore, that handheld, portable and other computing devices and computing objects of all kinds are contemplated for use in connection with the various embodiments. Accordingly, the below general purpose remote computer described below in FIG. 8 is but one example of a computing device.

Embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 8:
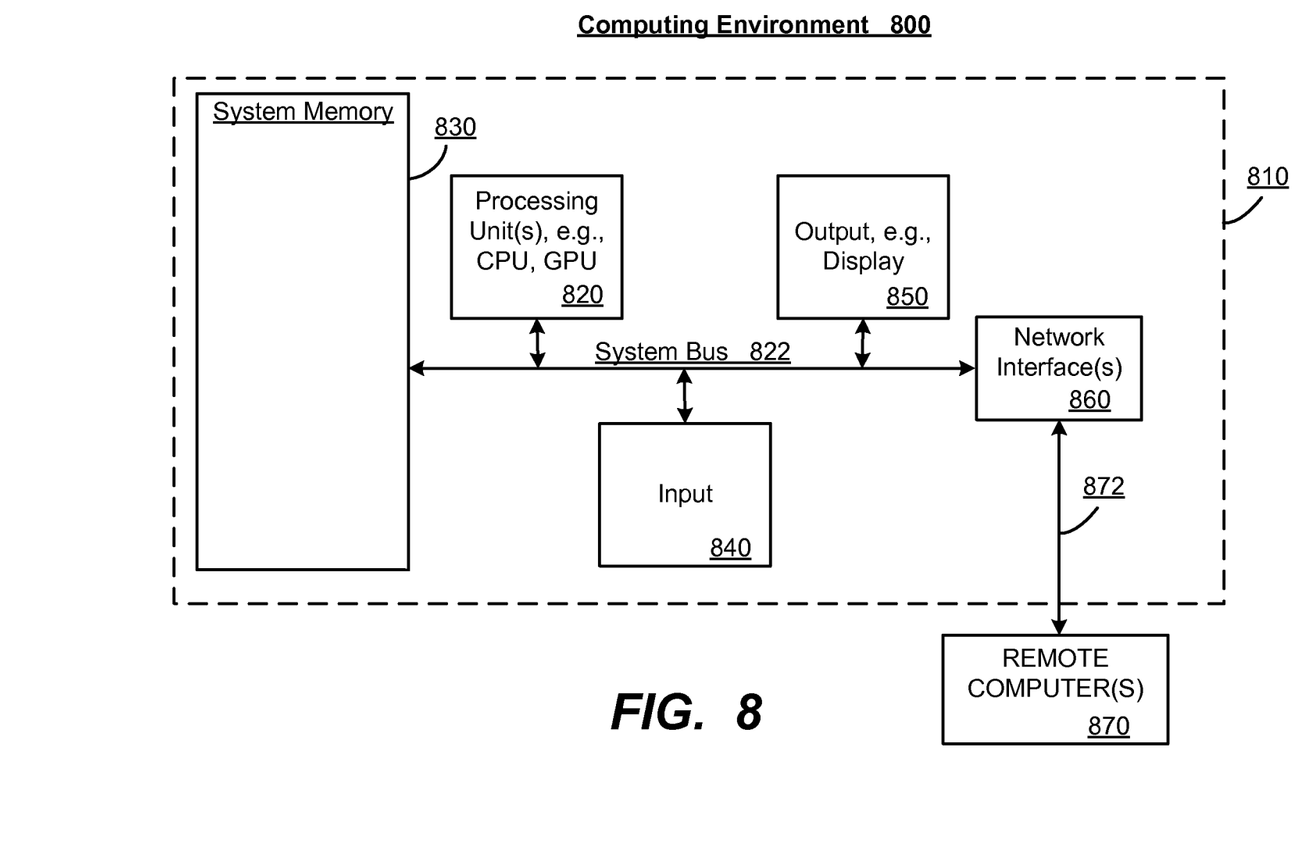
FIG. 8 is a block diagram representing an example non-limiting computing system or operating environment in which one or more aspects of various embodiments described herein can be implemented.

FIG. 8 thus illustrates an example of a suitable computing system environment 800 in which one or aspects of the embodiments described herein can be implemented, although as made clear above, the computing system environment 800 is only one example of a suitable computing environment and is not intended to suggest any limitation as to scope of use or functionality. In addition, the computing system environment 800 is not intended to be interpreted as having any dependency relating to any one or combination of components illustrated in the example computing system environment 800.

With reference to FIG. 8, an example remote device for implementing one or more embodiments includes a general purpose computing device in the form of a computer 810. Components of computer 810 may include, but are not limited to, a processing unit 820, a system memory 830, and a system bus 822 that couples various system components including the system memory to the processing unit 820.

Computer 810 typically includes a variety of computer readable media and can be any available media that can be accessed by computer 810. The system memory 830 may include computer storage media in the form of volatile and/or nonvolatile memory such as read only memory (ROM) and/or random access memory (RAM). By way of example, and not limitation, system memory 830 may also include an operating system, application programs, other program modules, and program data.

A user can enter commands and information into the computer 810 through input devices 840. A monitor or other type of display device is also connected to the system bus 822 via an interface, such as output interface 850. In addition to a monitor, computers can also include other peripheral output devices such as speakers and a printer, which may be connected through output interface 850.

The computer 810 may operate in a networked or distributed environment using logical connections to one or more other remote computers, such as remote computer 870. The remote computer 870 may be a personal computer, a server, a router, a network PC, a peer device or other common network node, or any other remote media consumption or transmission device, and may include any or all of the elements described above relative to the computer 810. The logical connections depicted in FIG. 8 include a network 872, such local area network (LAN) or a wide area network (WAN), but may also include other networks/buses. Such networking environments are commonplace in homes, offices, enterprise-wide computer networks, intranets and the Internet.

As mentioned above, while example embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

Conclusion

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. In a computing environment, a method for partitioning a code base into a trusted portion and an untrusted portion, the method performed at least in part on at least one processor, the method comprising:
    identifying program elements that correspond to sensitive data within the code base using annotation information and performing taint propagation on the code base;
    on determining that a first set of the program elements do not exceed a size threshold, assigning the first set of the program elements to the trusted portion of the code base; and
    on determining that a second set of the program elements exceed the size threshold:
        automatically transforming the second set of program elements into secure program elements using a cryptographic technique;
        assigning the second set of program elements to the untrusted portion of the code base.

2. The method of claim 1, wherein identifying the program elements further comprises producing an intermediate representation of the code base comprising the program elements in canonical form.

3. The method of claim 2, wherein producing the intermediate representation further comprises converting each program element into a statement format.

4. The method of claim 1, wherein automatically transforming the second set of program elements further comprises modifying a data format associated with one or more of the program elements.

5. The method of claim 1, wherein automatically transforming the second set of program elements further comprises expanding a size of a program element to enable encryption.

6. The method of claim 1, wherein automatically transforming the second set of program elements further comprises inserting operations for encrypting the sensitive data.

7. The method of claim 1, wherein automatically transforming the second set of program elements further comprises retaining dataflow operations for the sensitive data in the untrusted portion.

8. The method of claim 1, wherein automatically transforming the second set of program elements further comprises generating one or more secure functions for computation operations corresponding to the sensitive data.

9. The method of claim 1, wherein automatically transforming the second set of program elements further comprises identifying input variables that reference the sensitive data.

10. The method of claim 1, wherein automatically transforming the second set of program elements further comprises identifying dependent variables associated with input variables.

11. In a computing environment, a system comprising:
    at least one processor; and
    a memory communicatively coupled to the at least one processor, the memory including components comprising:
        an automated partitioning mechanism configured to:
            separate a code base into a trusted code portion and an untrusted code portion;
            designate a first set of program elements that reference sensitive data and do not exceed the size threshold as trusted code in the trusted code portion; and
            designate a second set of program elements that reference the sensitive data and exceed a size threshold as untrusted code in the untrusted code portion, wherein the automated partitioning mechanism further comprises a cryptographic module configured to:
                encrypt the second set of program elements that reference sensitive data;
                generate secure program elements from an intermediate representation of the code base; and
                perform taint propagation on the code base to identify the program elements.

12. The system of claim 11, wherein the automated partitioning mechanism, based on annotation information, is further configured to classify other program elements as the trusted code of the code base.

13. The system of claim 11, wherein the automated partitioning mechanism, based on the annotation information, is further configured to classify dataflow operations for input variables associated with the sensitive data as unprivileged.

14. The system of claim 13, wherein the automated partitioning mechanism is further configured to classify security-sensitive operations and dependent variables corresponding to the input variables as unprivileged.

15. The system of claim 11, wherein the automated partitioning mechanism is further configured to classify input variables as privileged.

16. The system of claim 11, wherein the automated partitioning mechanism is further configured to convert a computation operation associated with the sensitive data into one or more secure functions comprising the trusted code.

17. One or more computer-readable storage devices having computer-executable instructions, which when executed perform operations, comprising:
   producing an intermediate representation for an annotated program;
   performing taint propagation on the annotated program to identify one or more portions of the annotated program that reference sensitive data;
   partitioning the annotated program into trusted code and untrusted code comprising the one or more portions by designating dataflow operations on the sensitive data as the untrusted code and classifying computation operations associated with the sensitive data as the trusted code;
   examining a data type qualifier associated with a program element of the annotated program; and
   automatically determining whether to secure the program element.

18. The one or more computer-readable storage devices of claim 17 having further computer-executable instructions comprising: executing the trusted code at one privilege level and the untrusted code at another privilege level.

* * * * *